May 1, 1923. 1,453,952

A. SAMANICH

LOCK BOLT

Filed Aug. 22, 1921

INVENTOR
ANDREW SAMANICH
BY
*Hazard & Miller*
ATTORNEYS.

Patented May 1, 1923.

1,453,952

UNITED STATES PATENT OFFICE.

ANDREW SAMANICH, OF LOS ANGELES, CALIFORNIA.

LOCK BOLT.

Application filed August 22, 1921. Serial No. 494,324.

*To all whom it may concern:*

Be it known that I, ANDREW SAMANICH, a citizen of the United States, residing at Los Angeles, in the county of Los Angeles and State of California, have invented new and useful Improvements in Lock Bolts, of which the following is a specification.

This invention relates to lock bolts and more particularly to a locking device having cooperating members that can be inserted in a hole and by axial shifting of these members the same will be securely held within the hole. Such locking means as I employ may take the place of rivets in any construction that requires the use of the same.

Other objects and advantages will be seen from the following description of the accompanying drawings in which.

Figure 5:
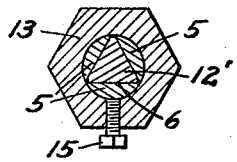
Fig. 5 is a sectional plan view taken on line 5—5 of Fig. 1.

A bolt 1 is shown having a head 2 and a stem 3 adapted to be passed through a hole in any device such as plates 4. Beginning intermediate of the ends of stem 3 are flexible locking members 5 formed integral with the lower portion of the stem 3 and as shown in the drawings these members are three in number, clearly shown in Fig. 5, and form an axial triangular opening 6 these members being separated as by longitudinal slots 7 which gives the necessary outward flexure which allows a locking stem to be inserted in the opening 6. I do not limit myself necessarily to a triangular opening as a round or square or any other shaped opening could be employed without departing from the principle of my invention.

The inner sides of the flexible locking members 5 have transverse grooves 8 with a horizontal portion 9 and a downwardly inwardly inclined portion 10 which allows upwardly and outwardly inclined side 11 of a locking stem 12' to be passed axially in the opening 6 and horizontal portions 12 of the locking stem will have engagements with the horizontal portions 9 of the flexible members when the locking stem is pulled in the reverse direction. The locking stem has the same number of sides so that it will have full locking engagement around its outer surface. A nut 13 has a hole 14 adapted to be slidably received over the flexible members 5 so that in the operation the bolt stem 3 is passed through a hole in plates 4 until the head 2 comes in contact with one side of the plates, or other object and the nut 13 is then passed down over the members 5 against the top until it comes in contact with the opposite side of the plates 4. The locking stem 12' which is longitudinally tapered is then forced down into the opening 6 so as to force the members 5 apart and into engagement with the hole 14 so as to securely hold the nut in position and the cooperating locking grooves of the stem and the flexible members will keep the stem in its forced position within the locking members 5. A set screw 15 may be passed through the nut 13 to provide against any relative movement between the nut and the bolt stem.

Figure 1:
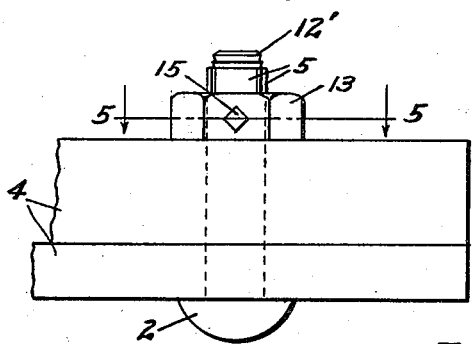
Fig. 1 is a side elevational view showing my device employed as a bolt for holding two members together.
Figure 6:
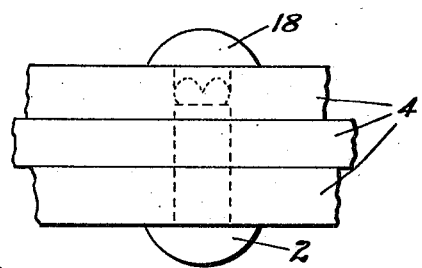
Fig. 6 is a side elevation showing the device employed as a rivet and holding a plurality of members in place.
Figure 2:
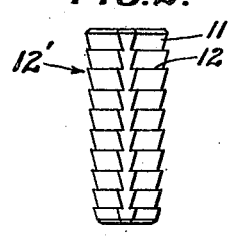
Fig. 2 is a side elevational view of the locking stem.
Figure 7:
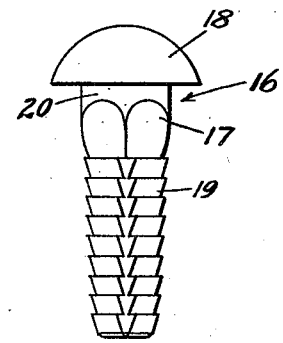
Fig. 7 is a side elevation showing a rivet with the locking means on the stem.
Figure 3:
Fig. 3 is a perspective of the nut that is used when the device is employed as a bolt.
Figure 4:
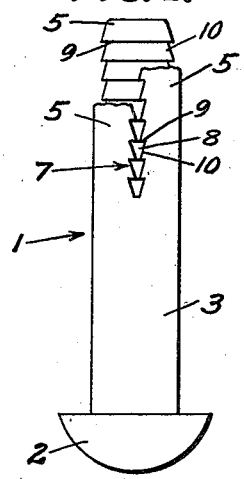
Fig. 4 is a side elevational view of the bolt stem with two of the flexible locking members broken away to show in elevation the transverse locking grooves of the third member.
Figure 8:
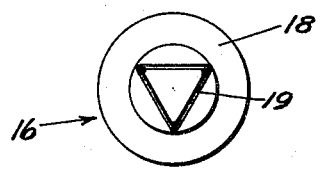
Fig. 8 is a bottom plan view of the rivet.

In Figs. 6, 7 and 8 I have shown the locking means employed in use on a rivet. The usual bolt member 1 is placed in a hole within plates 4 and the end terminates between the external side of the plates. Inserted within the hole 6 is a second member 16 having a stem 17 and a head 18 adapted to engage one side of the plates 4 for holding the same together. The stem 17 has the usual locking groove 19 adapted to engage the locking groove 7 of the bolt 1. The upper portion 20 of the stem 17 is cylindrical so that there will be provided a good bearing surface between the stem and one of the plates. It is obvious that in this operation it is only necessary to drive the member 16 into the opening 6 until the plates are firmly held together, and by having the stems 17 of the rivet and 12' of the bolt longitudinally tapered the holding power of the bolt is increased with continued axial shifting of the stem which causes the flexible members 5 to be forced tighter to the walls of the hole to which the same is passed.

Various changes may be made without departing from the spirit of my invention.

What is claimed is:

1. A lock bolt comprising a shank split longitudinally to provide a plurality of locking members, transverse projections formed interiorly of the locking members, a locking stem insertable into the shank between the members, and a nut embracing the members for the purpose described.

2. A lock bolt comprising a bolt portion having spaced resilient locking members, a locking stem insertable into the bolt portion between the members, cooperating notches formed on the stem and members, and a nut embracing the members.

In testimony whereof I have signed my name to this specification.

ANDREW SAMANICH.